UNITED STATES PATENT OFFICE.

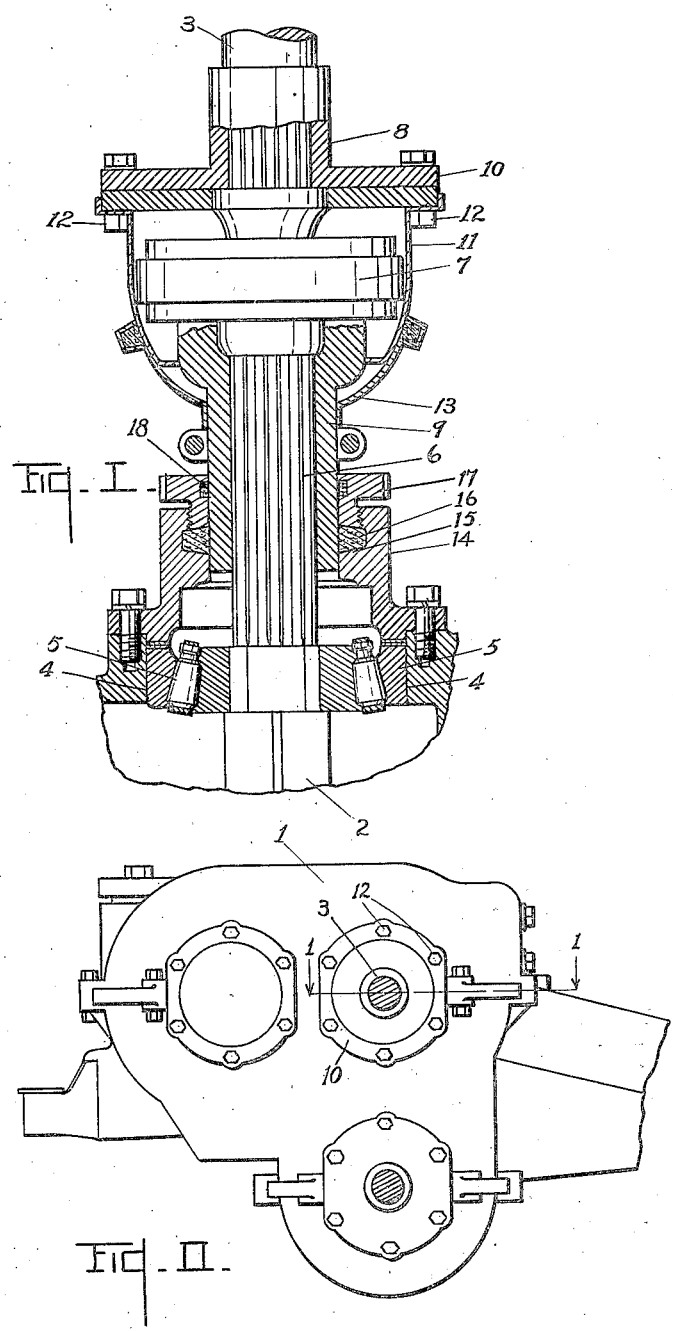

GEORGE JOSEPH THOMAS, OF LANSING, MICHIGAN.

DRIVING-GEARING.

1,381,945.             Specification of Letters Patent.     Patented June 21, 1921.

Application filed October 31, 1919. Serial No. 334,752.

*To all whom it may concern:*

Be it known that I, GEORGE JOSEPH THOMAS, a citizen of the United States, residing at Lansing, county of Ingham, State of Michigan, have invented certain new and useful Improvements in Driving-Gearing, of which the following is a specification.

This invention relates to improvements in driving gearing.

The main object of this invention is to provide an improved driving gearing for motor vehicles comprising a transmission gear box and shafts in which the parts are associated to provide strength and durability, and the moving parts and bearings are effectively protected.

Further objects, and objects relating to structural details, will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing forming a part of this specification, in which:

Figure I is a detail view of a structure embodying the features of my invention partially in section on a line corresponding to line 1—1 of Fig. II.

Fig. II is an end elevation of a structure embodying the features of my invention, the external shafts being shown in sections.

In the drawing similar reference characters refer to similar parts throughout the several views.

Referring to the drawing, 1 represents a transmission or variable speed gear box or casing, 2 one of the gearing shafts and 3 an external shaft coacting therewith. The gearing illustrated is substantially that of my application for Letters Patent filed August 31, 1918, Serial No. 252,153, my present application being a division of that application.

The gear box 1 is provided with a bearing opening 4 in which the roller bearing 5 for the shaft is arranged.

The shaft 2 has a splined portion 6 projecting beyond the bearing.

The shafts 2 and 3 are connected by a universal joint designated generally by the numeral 7 comprising a shaft member 8 operatively associated with the shaft 3 and a tubular shaft member 9 having sliding and driving engagement with the splined projections 6 of the shaft 2.

The shaft portion 8 has a flange-like housing portion 10 to which the joint housing 11 is secured by means of the bolts 12. The housing 11 is spherically curved at its outer end while the shaft member 9 has a cap housing member 13 coacting with this spherically curved part of the housing 11.

Mounted on the gear box is a housing member 14 embracing the bearing 4 and projecting outwardly to embrace the end of the shaft member 9. This housing member 14 has an internal annular rib-like gasket seat 15 for the packing ring 16. This packing ring is clamped upon the seat by means of the packing gland 17. The gland is preferably provided with an internal packing ring 18.

With the parts thus arranged, the bearing 4 is effectively housed, the escape of lubricant from the gear box is prevented and the joint shaft member 9 protected so that it is quite impossible for dirt and dust to reach the bearing surfaces between the shaft and the joint member.

The structure is strong and durable and the parts are readily assembled and disassembled.

I have illustrated an adaptation of my improvements which I have found very practical in use. I have not attempted to illustrate or describe other adaptations or embodiments as I believe the disclosure made will enable those skilled in the art to which my invention relates to embody or adapt the same as may be desired.

Having thus described my invention, what I claim as new and desire to secure by Letters Patent, is:

In a structure of the class described, the combination of a gear box having a bearing in a wall thereof, a shaft in said gear box projecting from said bearing, a coacting shaft, a universal joint connection for said shafts comprising a tubular shaft member having sliding and driving engagement with said shaft projecting from said gear box, a housing member mounted on said casing to inclose said bearing and projecting outwardly to embrace said joint shaft member, said housing member having an internal annular gasket seat, a gasket arranged within said housing member against said seat to embrace said joint shaft member, and a packing gland threaded into said housing member to engage said gasket.

In witness whereof, I have hereunto set my hand and seal in the presence of two witnesses.

GEORGE JOSEPH THOMAS. [L. S.]

Witnesses:
GEORGE W. HEWITT,
JAS. W. PARMELEE.